United States Patent
Dalmayrac et al.

(10) Patent No.: US 10,203,500 B2
(45) Date of Patent: Feb. 12, 2019

(54) DISPLAY, IN PARTICULAR HEADS-UP DISPLAY, PARTICULARLY FOR A MOTOR VEHICLE

(71) Applicant: VALEO COMFORT AND DRIVING ASSISTANCE, Creteil (FR)

(72) Inventors: Stephane Dalmayrac, Créteil (FR); Stephane Dutre, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 24 days.

(21) Appl. No.: 14/898,528

(22) PCT Filed: Jun. 27, 2014

(86) PCT No.: PCT/FR2014/000151
§ 371 (c)(1),
(2) Date: Mar. 28, 2016

(87) PCT Pub. No.: WO2014/207329
PCT Pub. Date: Dec. 31, 2014

(65) Prior Publication Data
US 2016/0259165 A1    Sep. 8, 2016

(30) Foreign Application Priority Data
Jun. 28, 2013 (FR) ...................... 13 01527

(51) Int. Cl.
*G02B 27/01*   (2006.01)
*G03B 21/14*   (2006.01)
(Continued)

(52) U.S. Cl.
CPC ..... *G02B 27/0149* (2013.01); *G02B 27/0101* (2013.01); *G03B 21/145* (2013.01);
(Continued)

(58) Field of Classification Search
CPC .. G02B 27/0149; G02B 27/015; G02B 27/01; G02B 27/0101; G02B 27/0006;
(Continued)

(56) References Cited

U.S. PATENT DOCUMENTS

| 5,204,666 A | 4/1993 | Aoki et al. |
| 5,237,455 A * | 8/1993 | Bordo ................ G02B 27/0101 |
| | | 359/602 |

(Continued)

FOREIGN PATENT DOCUMENTS

| EP | 2 093 094 A1 | 8/2009 | |
| JP | H10-194009 | * 7/1998 | ............. B60K 35/00 |

(Continued)

OTHER PUBLICATIONS

Machine English translation of Takeuchi Shoichi, "Headup Display", JPH10-194009, Jul. 28, 1998 (Year: 1998).*

(Continued)

*Primary Examiner* — Marin Pichler
(74) *Attorney, Agent, or Firm* — Osha Liang LLP

(57) ABSTRACT

The invention relates to a display (1), in particular a heads-up display, for displaying a virtual image in a vehicle driver's field of view, said display (1) comprising a semi-reflective blade (5) for displaying said virtual image and one or more optical elements (3, 7) for projecting an image toward said semi-reflective blade (5), said display (1) being configured to allow a movement of said optical element or elements (3, 7) so as to allow said semi-reflective blade (5) to be retracted when the display (1) is stopped, along a path passing through a location of said optical element or elements (3, 7) when the display (1) is operating.

16 Claims, 2 Drawing Sheets

(51) Int. Cl.
*G03B 21/30* (2006.01)
*G02B 27/00* (2006.01)

(52) U.S. Cl.
CPC .......... *G03B 21/30* (2013.01); *G02B 27/0006* (2013.01); *G02B 2027/0154* (2013.01); *G02B 2027/0159* (2013.01)

(58) Field of Classification Search
CPC .... G02B 2027/0154; G02B 2027/0159; G02B 2027/0161; G02B 2027/0162; G02B 2027/0169
See application file for complete search history.

(56) References Cited

U.S. PATENT DOCUMENTS

| | | | | |
|---|---|---|---|---|
| 6,012,785 | A * | 1/2000 | Kawasaki | G01D 11/24 312/29 |
| 6,504,518 | B1 * | 1/2003 | Kuwayama | G02B 27/01 340/980 |
| 7,869,129 | B2 * | 1/2011 | Lebreton | B60K 35/00 345/7 |
| 2002/0012173 | A1 * | 1/2002 | Aoki | G02B 27/0101 359/630 |
| 2005/0024490 | A1 * | 2/2005 | Harada | G02B 27/0149 348/115 |
| 2008/0285138 | A1 * | 11/2008 | Lebreton | B60K 35/00 359/630 |
| 2009/0086329 | A1 * | 4/2009 | Potakowskyj | G02B 27/0149 359/630 |
| 2010/0046082 | A1 * | 2/2010 | Croy | B60K 35/00 359/632 |
| 2013/0194518 | A1 * | 8/2013 | Moussa | G02B 7/1821 349/11 |
| 2014/0320382 | A1 * | 10/2014 | Moussa | G02B 27/0149 345/7 |

FOREIGN PATENT DOCUMENTS

| | | |
|---|---|---|
| WO | 2007/057608 A1 | 5/2007 |
| WO | 2008/063632 A2 | 5/2008 |
| WO | 2012/007305 A1 | 1/2012 |

OTHER PUBLICATIONS

International Search Report issued in corresponding application No. PCT/FR2014/000151 dated Sep. 4, 2014 (2 pages).

* cited by examiner

DISPLAY, IN PARTICULAR HEADS-UP DISPLAY, PARTICULARLY FOR A MOTOR VEHICLE

The invention relates to a display, in particular a heads-up display, particularly for a motor vehicle.

There is a known way of equipping vehicles with a display called a heads-up display. A device of this kind displays a virtual image in the field of view of the vehicle driver looking toward the windshield of the vehicle. This display device usually comprises an image generation device and optical components specific to the architecture of the device. A device of this kind supplies the driver with information of a general type, for example the speed of the vehicle, the external temperature, guidance information, the engine speed, and the like.

In particular, there is a known heads-up display which produces a virtual image by means of a semi-reflective blade called a combiner, which projects from the instrument panel. This combiner is usually mounted retractably under the instrument panel so that, notably, it is protected from mechanical stresses, climatic conditions and dust when the display is not in use. The overall dimensions of the display are influenced by the space which must be left free for this retraction, in spite of the nearby presence of the image generation device and the associated optical components.

The object of the invention is to improve this display, and to this end it proposes a display, in particular a heads-up display, for displaying a virtual image in a vehicle driver's field of view, said display comprising a semi-reflective blade for displaying said virtual image and one or more optical elements for projecting an image toward said semi-reflective blade, said display being configured to allow a movement of said optical element or elements so as to allow said semi-reflective blade to be retracted when the display is stopped, along a path passing through a location of said optical element or elements when the display is operating.

Thus the retraction of the semi-reflective blade is associated with a movement of the component, or at least one of the components, of the display which is located nearby when the display is operating. This is because these components are not restricted to a fixed geometric position when the display is stopped, and can be moved from their geometric position to free space for the retraction of the semi-reflective blade. Said retraction is thus less spatially constrained by the geometric position of said components.

It is, notably, useful to configure in the aforesaid way the component or components which are most obstructive to said retraction of the semi-reflective blade.

According to different embodiments of the invention, which may be considered separately or in combination:
  said display is configured to protect said semi-reflective blade, after retraction,
  said display comprises a cover, cap or casing protecting said reflective blade from external impacts and/or from dust after retraction,
  said casing is an insulating enclosure configured to protect said semi-reflective blade from climatic variations, in particular condensation, after retraction,
  said casing houses said optical element or elements,
  said semi-reflective blade and said optical element or at least one of said optical elements are mounted on one or more mechanical movement devices to allow their movement, when the display is stopped, for said retraction of the semi-reflective blade from a position of use to a retracted position of the semi-reflective blade and/or vice versa,
  said mechanical devices are configured to allow a combined movement of the semi-reflective blade and of said optical element or at least one of said optical elements, in particular from the position of use to the retracted position of the semi-reflective blade and/or vice versa,
  said mechanical device or devices are capable of moving, successively and/or simultaneously, said semi-reflective blade and said optical element or at least one of said optical elements, in particular from the position of use of the display to the retracted position of the semi-reflective blade and/or vice versa,
  said optical elements comprise an image generation device and, if required, optical components for the transmission of said images,
  said image generation device and/or at least one of said optical components for image transmission are movable from the position of use of the display to a position which frees space to allow said retraction of the semi-reflective blade and/or vice versa,
  said image generation device is movable in rotation, notably about an axis passing through said image generation device,
  said optical component or components for image transmission are fixed,
  said semi-reflective blade is pivoted for rotary movement about a remote axis, for example parallel to the axis of rotation of said image generation device,
  the mechanical device for moving the semi-reflective blade is positioned laterally with respect to the image generation device,
  said display comprises a control unit for controlling the movement of said mechanical device or devices,
  said device comprises stops for positioning said semi-reflective blade and/or said movable optical elements in the position of use, thus facilitating the correct formation of the image.

These characteristics and advantages of the invention, as well as others, will be more fully evident from the following description of embodiments of the invention, given with reference to the attached drawings, in which.

It should be noted that the figures show the invention in a detailed manner for the purpose of applying the invention, said figures obviously being usable in order to define the invention more closely if necessary.

In the following description, identical references are used to denote similar or identical elements.

Figure 1:
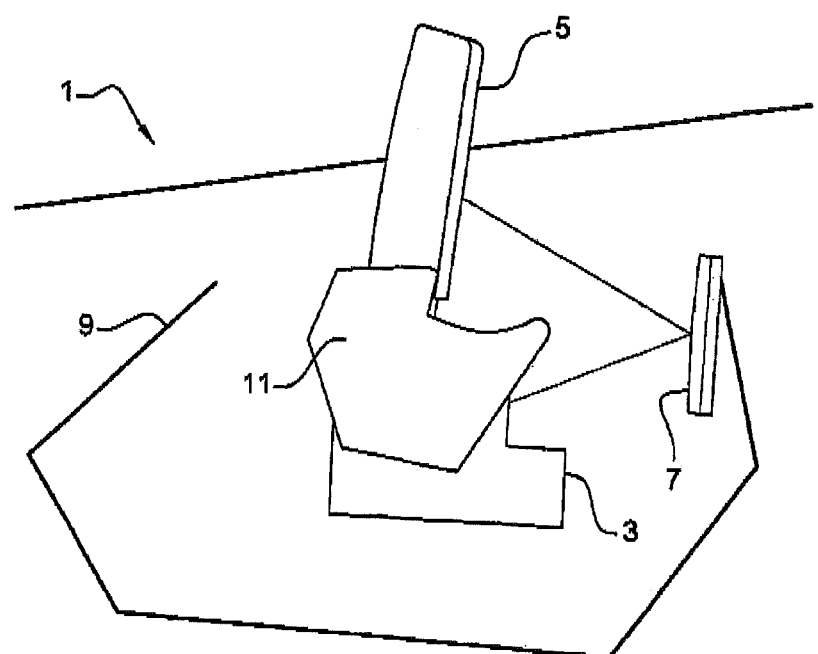
FIG. 1 is a schematic partial view in elevation of an image display according to the invention, in the position of use.

As shown in FIG. 1, the invention relates to a display 1, also called a heads-up display, for displaying a virtual image in the field of view of a vehicle driver observing the scene in front of the motor vehicle through the windshield.

The display 1 comprises a semi-reflective blade 5 for displaying said virtual image, and one or more optical elements 3, 7 for projecting an image toward said semi-reflective blade.

Said optical image projection element or elements comprise, in particular, an image generation device 3. This device comprises, for example, a scanning projector having one or more light sources, not shown, each emitting a beam of the laser type. These sources are, for example, laser sources, typically laser diodes, each laser source emitting a monochromatic beam, that is to say a beam consisting of a single color.

Said device 3 may typically comprise three sources. It is configured to form a light beam, by bringing together, in combination, beams individually emitted by each of said sources.

Said scanning projector may also comprise a scan generator having the function of moving the light beam horizontally and vertically to form an image at the output of said image generation device 3, at a surface such as, notably, a diffuser.

Downstream of the image generation device 3, in the direction of movement of the light beam, said display comprises, in this case, another component of said optical image projection element or elements, namely an optical component 7 for the transmission of said images, and said semi-reflective blade 5, also called a combiner.

Said optical transmission component 7 can be used to reflect the rays emitted by the image generation device 3 toward the combiner. It may be a mirror.

Said combiner enables the image to be displayed beyond the windshield of the vehicle equipped with the display, on a virtual screen, provided by means of said semi-reflective blade.

According to the invention, said display is configured to move said optical projection element or elements 3, 7 so as to allow said reflective blade 5 to be retracted when the display is stopped, along a path passing through a location of said optical element or elements 3 when the display is operating. In other words, said optical image projection elements, which are normally fixed, are made movable so that they can be shifted to allow the passage of the semi-reflective blade 5.

Thus the semi-reflective blade 5 can be retracted along a short path, by a simple mechanism, which will not be constrained by the location of the optical elements of the display.

Said display 1 is, more precisely, configured to protect said semi-reflective blade 5 after retraction. For this purpose it comprises a cover, cap or casing 9, as illustrated, defining a housing for said reflective blade 5 and protecting it from external impacts and/or from dust after retraction.

Said casing 9 is advantageously an insulating enclosure configured to protect said semi-reflective blade 5 from climatic variations, in particular condensation, after retraction.

The casing 9 also houses said optical projection element or elements 3, 7, which are consequently also protected.

Figure 3:
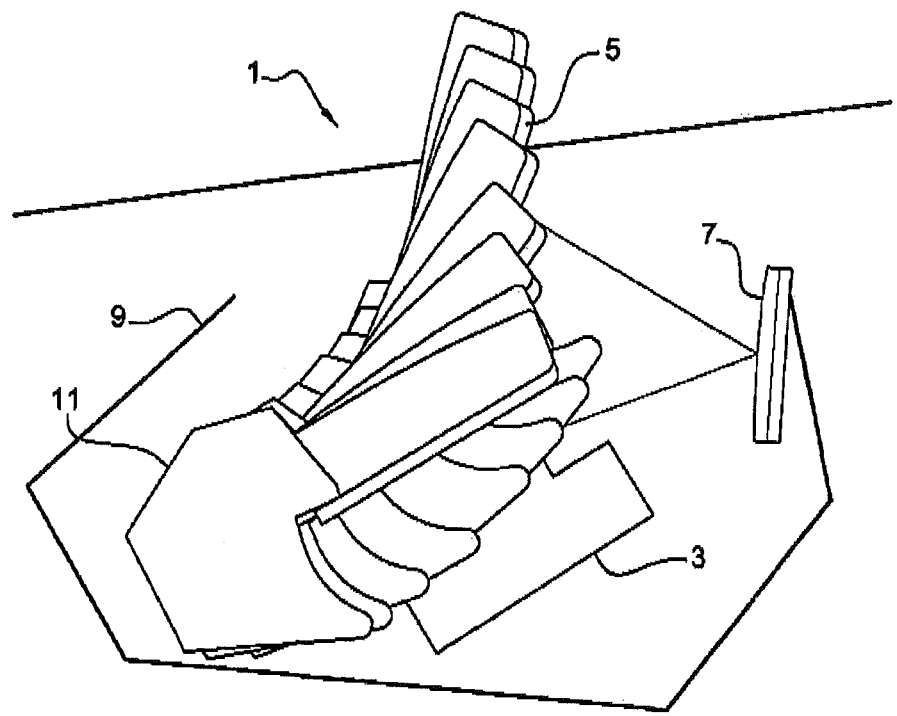
Figure 4:
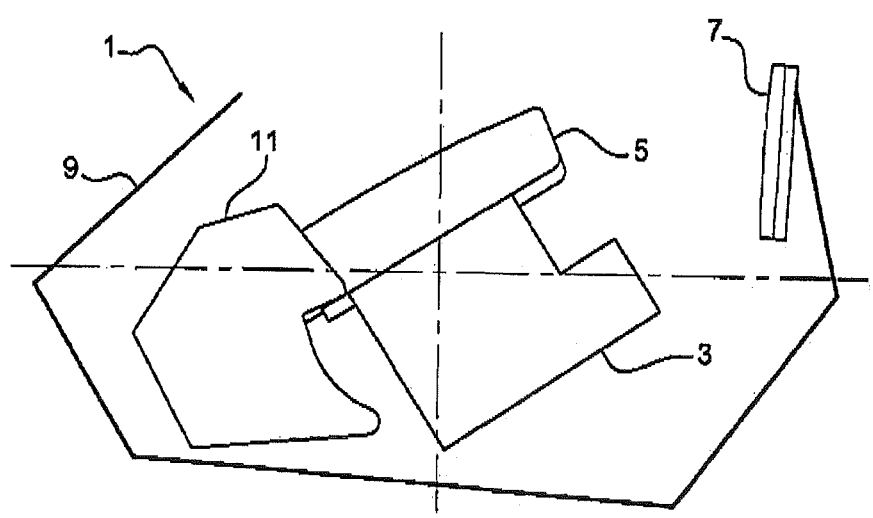
FIG. 4 is a view similar to the preceding views, showing the display in the retracted position of the combiner.

Said semi-reflective blade 5 and said optical element or at least one of said optical elements, in this case the image generator 3, are mounted on one or more mechanical movement devices (not shown) to allow their movement, when the display is stopped, for said retraction of the semi-reflective blade 5, as illustrated in FIG. 3 in particular, from a position of use (FIG. 1) to a retracted position of the semi-reflective blade (FIG. 4) and/or vice versa.

Said mechanical device or devices are configured to allow a combined movement of the semi-reflective blade 5 and said optical element or at least one of said optical elements, in this case the said image generator 3, from the position of use to the retracted position of the semi-reflective blade 5 and/or vice versa. They may take the form of an ordinary mechanical device, for example a triangular assembly or pantograph or other device supporting the reflective blade 5 and/or the optical element or elements 3 of the display.

Thus said mechanical device or devices can move, successively and/or simultaneously, said semi-reflective blade 5 and said optical element or elements 3, in particular from the position of use of the display to the retracted position of the semi-reflective blade and/or vice versa.

Figure 2:
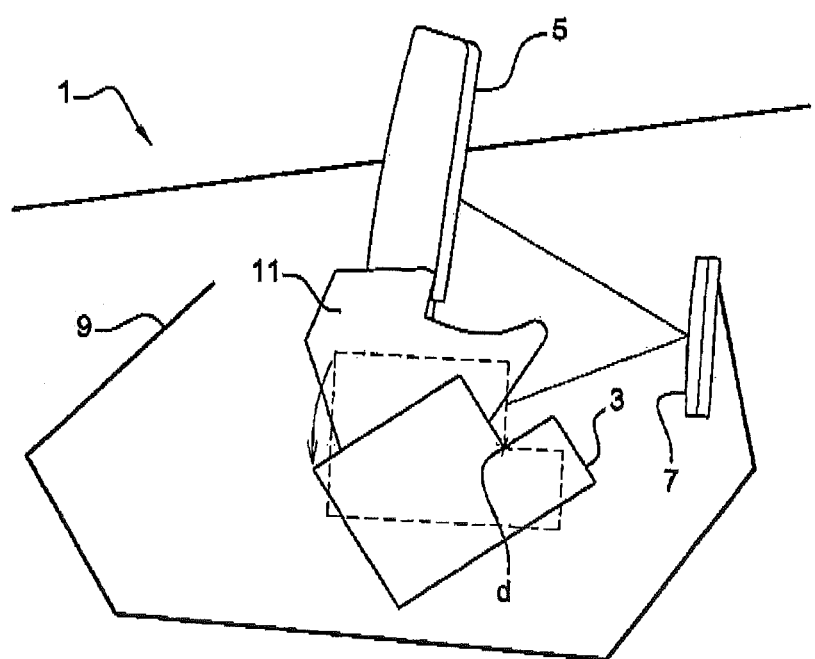
FIGS. 2 and 3 are similar views of the display device of FIG. 1, with the combiner in the process of retraction.

According to the example shown in FIG. 2, said image generation device 3 is movable in rotation about an axis d passing through said image generation device 3. This axis d is in the plane of the vehicle, that is to say substantially horizontal in normal running conditions of the vehicle.

Said optical component or components for image transmission, namely the mirror 7 in this case, are fixed.

According to a variant which is not shown, the optical mirror of the display could be movable to allow said semi-reflective blade to be retracted when the display is stopped. This possibility may be considered, depending on the shape of the reflective blade and the space available to house the latter under the vehicle's instrument panel.

Said semi-reflective blade 5 is pivoted, in the example, for rotary movement about an axis remote from the blade, for example and axis which is parallel to the axis of rotation d of said image generation device and is located above the latter. More precisely, it is fixed to a lower support device 11 laterally adjacent to the image generation device 3. This support device 11 is itself fixed to the mechanical device for moving the semi-reflective blade 5 from the substantially vertical position of use, when the display is stopped, to said retracted position in which the blade is withdrawn into said casing, FIG. 4. In the latter position, the semi-reflective blade 5 is, in this case, just above the image generation device 3, or even next to the latter, while being protected in the casing 9 of the display.

This mechanical and/or support device 11 of the semi-reflective blade, positioned in this case laterally with respect to the image generation device, may take the form of a linkage or pantograph driven by an electric motor.

Said display may also comprise a control unit for controlling the movement of said mechanical device or devices, in this case the movement of the image generation device 3, by means of said electric motor.

According to a variant embodiment which is not illustrated, the semi-reflective blade could be mounted on an optical component of the display, or in practice on a support of one of the optical elements, for example a support of a mirror reflecting some of the output light beam of the image generation device, this optical element then being movable for moving the semi-reflective blade 5, when the display stops, from a position of use to a retracted position of the semi-reflective blade 5 and vice versa. The movements of the optical element or elements will preferably be provided by one or more electric motors controlled by the control unit.

Thus the invention provides a display for a vehicle which, notably, makes it possible to simplify the mechanism for retracting the semi-reflective blade or combiner.

The invention claimed is:
1. A heads-up display, for displaying a virtual image in a vehicle driver's field of view, said display comprising:
   a semi-reflective blade for displaying said virtual image; and
   one or more optical elements for projecting an image toward said semi-reflective blade,
   said display being configured to allow, in a stopped state, a movement of said optical element or elements to allow said semi-reflective blade to be retracted along a path passing through a location of said optical element or elements in an operating state.

2. The display as claimed in claim 1, configured to protect said semi-reflective blade after retraction.

3. The display as claimed in claim 2, further comprising a cover, cap or casing protecting said semi-reflective blade from external impacts and/or from dust after retraction.

4. The display as claimed in claim 3, wherein said casing is an insulating enclosure configured to protect said semi-reflective blade from climatic variations comprising condensation, after retraction.

5. The display as claimed in claim 4, in which said enclosure or casing houses said optical element or elements.

6. The display as claimed in claim 1, wherein said semi-reflective blade and said optical element or at least one of said optical elements are mounted on one or more mechanical movement devices to allow their movement for said retraction of the semi-reflective blade from a position of use to a retracted position of the semi-reflective blade and/or vice versa.

7. The display as claimed in claim 6, wherein said mechanical device or devices are configured to allow a combined movement of said semi-reflective blade and said optical element or at least one of said optical elements.

8. The display as claimed in claim 6, wherein said mechanical device or devices are capable of moving, successively and/or simultaneously, said semi-reflective blade and said optical element or at least one of said optical elements.

9. The display as claimed in claim 6, wherein said optical elements comprise an image generation device.

10. The display as claimed in claim 9, wherein said image generation device and/or at least one optical component for image transmission are movable from the position of use of the display to a position which frees space to allow said retraction of the semi-reflective blade and/or vice versa.

11. The display as claimed in claim 9, wherein at least one optical component for image transmission is fixed.

12. The display as claimed in claim 9, wherein said image generation device is movable in rotation about an axis d passing through said image generation device.

13. The display as claimed in claim 12, wherein said semi-reflective blade is pivoted for rotary movement about a remote axis, parallel to the axis of rotation d of said image generation device.

14. The display as claimed in claim 9, wherein the mechanical device for moving the semi-reflective blade is positioned laterally with respect to the image generation device.

15. The display as claimed in claim 6, further comprising a control unit for controlling the movement of said one or more mechanical movement devices.

16. The display as claimed in claim 9, wherein said optical elements further comprise optical components for the transmission of said images.

* * * * *